United States Patent

Fukami

[11] Patent Number: 5,757,554
[45] Date of Patent: May 26, 1998

[54] ZOOM LENS

[75] Inventor: Kiyoshi Fukami, Kanagawa-ken, Japan

[73] Assignee: Canon Kabushiki Kaisha, Tokyo, Japan

[21] Appl. No.: 665,500

[22] Filed: Jun. 18, 1996

[30] Foreign Application Priority Data

Jun. 29, 1995 [JP] Japan ................ 7-188671

[51] Int. Cl.⁶ ........................ G02B 15/14
[52] U.S. Cl. ........................ 359/684; 359/688
[58] Field of Search ................ 359/683, 688, 359/686, 684

[56] References Cited

U.S. PATENT DOCUMENTS

| | | | |
|---|---|---|---|
| 3,563,636 | 2/1971 | Macher | 359/688 |
| 4,099,845 | 7/1978 | Takesi et al. | 350/184 |
| 4,110,006 | 8/1978 | Ikemori | 350/684 |
| 4,752,121 | 6/1988 | Kitagishi | 350/427 |
| 4,765,722 | 8/1988 | Aono | 359/688 |
| 5,097,360 | 3/1992 | Fukami et al. | 359/674 |
| 5,136,431 | 8/1992 | Terasawa et al. | 359/684 |
| 5,191,475 | 3/1993 | Terasawa et al. | 359/684 |

FOREIGN PATENT DOCUMENTS

| | | |
|---|---|---|
| 52-109952 | 9/1977 | Japan. |
| 52-128153 | 10/1977 | Japan. |
| 52-41068 | 10/1977 | Japan. |
| 55-57815 | 4/1980 | Japan. |
| 55-117119 | 9/1980 | Japan. |
| 59-4686 | 1/1984 | Japan. |
| 61-53696 | 11/1986 | Japan. |
| 6-242378 | 9/1994 | Japan. |

OTHER PUBLICATIONS

Patent Abstracts of Japan, vol. 18, No. 627 (P–1834), Nov. 29, 1994 (JP 6–242378, Sep. 2, 1994).
Patent Abstracts of Japan, vol. 4, No. 95 (P–18), Jul. 9, 1980 (JP 55–57815, Apr. 30, 1980).

Primary Examiner—Scott J. Sugarman
Attorney, Agent, or Firm—Fitzpatrick, Cella, Harper & Scinto

[57] ABSTRACT

A zoom lens comprises, in order from an object side to an image side, a first lens unit of positive refractive power which is stationary during zooming, a second lens unit of negative refractive power which is axially movable during zooming, a third lens unit which is axially movable during zooming, and a fourth lens unit of positive refractive power which is stationary during zooming, wherein the first lens unit comprises a front lens sub-unit including at least one positive lens and having a negative refractive power as a whole, an intermediate lens sub-unit including at least one positive lens and a cemented lens and having a positive refractive power as a whole, and a rear lens sub-unit including a cemented lens and having a positive refractive power as a whole, and wherein the intermediate lens sub-unit is moved toward the image side to effect focusing from an infinitely distant object to an object at a minimum object distance.

4 Claims, 10 Drawing Sheets

ZOOM LENS

BACKGROUND OF THE INVENTION

1. Field of the Invention

This invention relates to zoom lenses suited to be used in television cameras, video cameras, photographic cameras, or the like and, more particularly, to a large relative aperture, high range zoom lens having a relative aperture of 1.64 in F-number at the wide-angle end and a zoom ratio of 8 to 15 and having its front or first lens unit constructed with a plurality of lens sub-units, one lens sub-unit of which is made movable for focusing, or employing the so-called inner focusing method, to shorten the minimum object distance.

2. Description of the Related Art

For the zoom lens to be used in a television camera or the like, along with the advance of the technique of minimizing the size of the television camera, there has been a growing demand for improving the compact form of the entirety of the lens system, while nonetheless desiring much more increases of the relative aperture and the range of variation of magnification.

The focusing method of moving a lens unit disposed in front of the lens unit for varying magnification is superior to the others in view of the zoom lens configuration. Since this method permits zooming and focusing to be performed independently of each other, it is possible to assure simplification of the structure of construction of the operating mechanism. Other surpassing merits are that the image sharpness is not affected by zooming and that, for an equivalent object distance, the focusing movement remains constant regardless of any zooming position whatever.

Of the zoom lenses employing such a focusing method, there is a zoom lens comprising, in order from an object side, a first lens unit of positive refractive power for focusing (focusing lens unit), a second lens unit of negative refractive power for varying magnification (variator lens unit), a third lens unit of positive or negative refractive power for compensating for the shift of an image plane caused by the variation of magnification (compensator lens unit), an aperture stop and a fourth lens unit of positive refractive power for forming an image (relay lens unit), totaling four lens units, that is, the so-called 4-unit zoom lens, wherein a lens sub-unit which is a part of the first lens unit is made movable for focusing. A zoom lens employing such a so-called "inner" focus type has previously been proposed in, for example, Japanese Patent Publication No. Sho 59-4686.

In the above Japanese Patent Publication No. Sho 59-4686, the first lens unit is constructed with three lens sub-units, of which the first lens sub-unit is of negative refractive power, the second lens sub-unit is of positive refractive power and the third lens sub-unit is of positive refractive power. Focusing is effected from an infinitely distant object down to an object at a minimum distance, by axially moving the second lens sub-unit toward the image side.

Japanese Laid-Open Patent Applications Nos. Sho 52-109952, Sho 55-57815 and Sho 55-117119 and Japanese Patent Publications Nos. Sho 61-53696 and Sho 52-41068, etc., also disclose 4-unit zoom lenses, wherein the first lens unit is divided into a plurality of lens sub-units, of which a lens sub-unit nearest to the object side is made stationary during focusing, while one of the subsequent lens sub-units near to the image side is made movable for focusing, employing the inner focusing method.

Also, in Japanese Laid-Open Patent Application No. Sho 52-128153, the first lens unit is divided into two lens sub-units, wherein the separation between the two lens sub-units increases when focusing is effected from an infinitely distant object to an object at a finite distance.

In general, the inner focus type of zoom lens, as compared with another zoom lens in which the entirety of the first lens unit is moved for focusing, enjoys unique advantages that the effective diameter of the first lens unit becomes smaller, thereby facilitating improvements of the compact form of the whole of the lens system, also that close-up photography, particularly supershort focusing, becomes easy to do, and further that, since the focusing lens sub-unit is relatively small in size and light in weight, so much smaller a driving force suffices, making it possible to ensure rapid focus adjustment.

For the zoom lens to increase its relative aperture (to, for example, 1.64 in F-number) and its variable magnification ratio (to, for example, 8 or higher), while still obtaining a good stability of high optical performance throughout the entire variable magnification range and throughout the entire focusing range, it is necessary to set forth appropriate rules of design for the refractive powers of all the lens units, the form and the construction and arrangement of the constituent lenses, and the contribution of each lens unit to achromatism.

In general, to assure reduction of the variation of all aberrations to obtain a high optical performance throughout the entire variable magnification range and throughout the entire focusing range, it has been required to rely on, for example, either one of the idea that the power of every lens unit is so weakened that it produces a smaller amount of aberrations and the idea that the number of lens elements in every lens unit is increased to increase the degree of freedom on correction of aberrations. For this reason, if it is intended to achieve a zoom lens whose relative aperture and variable magnification ratio are increased at once, it is unavoidable that the air separation between any adjacent two of the lens units becomes unduly greater, or that the total number of lens elements increases. As a result, a problem arises in that the whole of the lens system becomes very bulky and very heavy.

Also, the recent trend of developing zoom lenses for broadcasting is to even more widen the field angle and even more extend the variable magnification range. In addition, improvements of the imaging performance for the close object and shortening of the minimum object distance are becoming one of the important factors on the specifications and the display of pictures.

In such a zoom lens for broadcasting, however, the variations with focusing of all aberrations, particularly spherical aberration, longitudinal chromatic aberration and astigmatism are so prominent that a good stability of optical performance is very difficult to maintain throughout. In this case, it is usual that the longer the focal length, or the smaller the F-number, that is, the larger the aperture ratio, or the shorter the minimum object distance, the larger the variations of aberrations tend to become.

The mechanism of varying the aberrations of a zoom lens is next explained on the assumption that the configuration of the above Japanese Patent Publication No. Sho 59-4686 is adopted.

Figure 13:
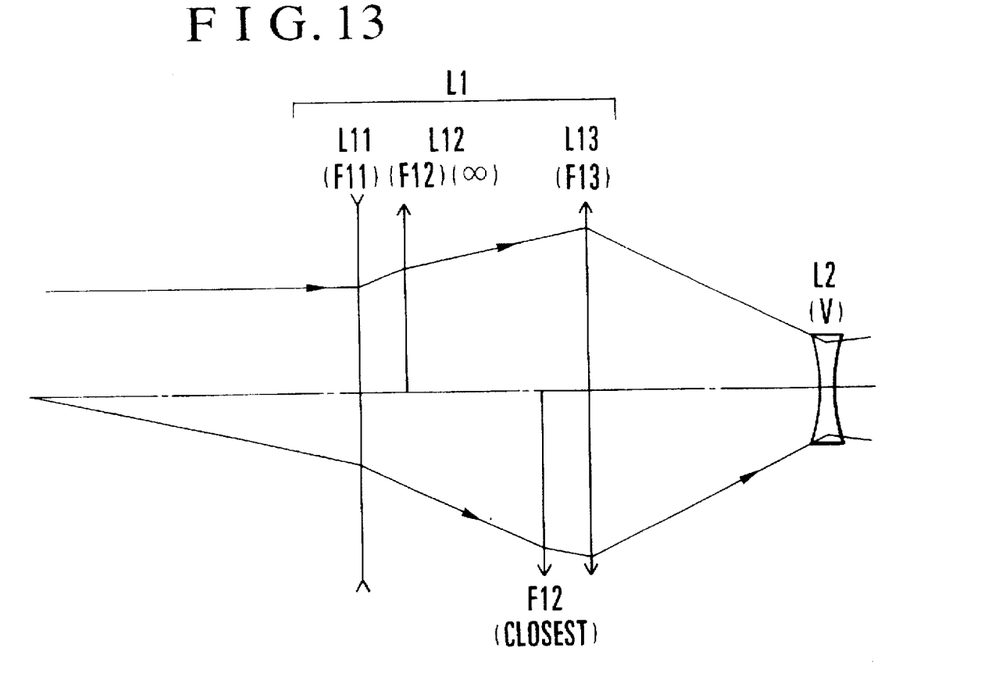
FIG. 13 is a diagram of geometry for explaining the difference between the heights of incidence of the ray on the first lens unit of the 4-unit zoom lens in the telephoto end with an object at infinity and at the minimum distance.

FIG. 13 is a diagram for explaining the thin lens system in the paraxial zone when the first lens unit L1 is constructed with a first lens sub-unit L11 of negative refractive power, a second lens sub-unit L12 of positive refractive power and a third lens sub-unit L13 of positive refractive power.

In FIG. 13, the upper half relative to an optical axis shows a focusing position with an object at infinity, and the lower half relative to the optical axis shows a focusing position with an object at the minimum distance. Again, a ray of light is selected based on the found value of the F-number for each focusing position in the telephoto end. As is apparent from FIG. 13, the height of incidence of the ray on the first lens sub-unit L11 becomes lower when focusing is effected on the closest object than when on the object at infinity. Conversely, on the second lens sub-unit L12, the height of incidence of the ray becomes higher. Because the first lens sub-unit L11 as a whole is negative in refractive power and also because the second lens sub-unit L12 is of positive refractive power, it results that, for the closest object, the chromatic aberrations are corrected negative as compared with those for the infinitely distant object.

Here, to assure a shortening of the minimum object distance, the space that admits of the range of axial movement of the second lens sub-unit L12 has to be taken larger, or both of the first and second lens sub-units L11 and L12 have to be strengthened in refractive power to increase the efficiency of focusing. According to the former method, the heights of incidence of that ray which is selected based on the F-number on the first and second lens sub-units are caused to vary to a larger extent and, therefore, the variation of the longitudinal chromatic aberration, too, becomes larger. Further, to allow the focusing range to extend toward even shorter object distances, the first lens sub-unit must take a more front position. Then, to admit of the ray from an extraaxial object point, the effective diameter of the first lens sub-unit for the wide-angle end has to increase, causing its weight to increase too much. According to the latter method, on the other hand, although the increase of the effective diameter can be avoided, the angle of divergence of that ray which is based on the F-number at the telephoto end from the first lens sub-unit is caused to increase. In turn, the heights of incidence of the ray on the first and second lens sub-units vary to either an equal or larger extent. Moreover, the varied amount of aberrations with variation of the height of incidence of the ray increases with an increase of the refractive powers of the first and second lens sub-units. As a result, the variation of longitudinal chromatic aberration becomes larger.

In either way, if, while leaving the lens configuration to be the same, it is intended to achieve shortening of the minimum object distance, the heights of incidence of the ray on the first and second lens sub-units come to vary to a larger extent. Also, to avoid an increase of the bulk and size of the zoom lens, there is need to increase the refractive power. Because of this, the increase of the range of variation of aberrations is further intensified, so that the longitudinal chromatic aberration for the telephoto end becomes worse.

SUMMARY OF THE INVENTION

The present invention is applied to a 4-unit zoom lens whose first lens unit for focusing is constructed with a front lens sub-unit, an intermediate lens sub-unit and a rear lens sub-unit. Of these lens sub-units, the intermediate lens sub-unit is made axially movable for focusing. With the employment of such an inner focusing method, in order to increase the aperture ratio and the variable magnification ratio, the present invention sets forth appropriate rules of design for the constituent lenses of each lens sub-unit to reduce the range of variation of spherical aberration, chromatic aberrations and others with zooming and focusing. It is, therefore, an object of the present invention to provide a large relative aperture, high range zoom lens having a good stability of optical performance maintained at a high level throughout the entire variable magnification range and throughout the entire focusing range.

A zoom lens according to the present invention comprises, in order from an object side to an image side, a first lens unit of positive refractive power which is stationary during zooming, a second lens unit of negative refractive power which is axially movable during zooming, a third lens unit which is axially movable during zooming, and a fourth lens unit of positive refractive power which is stationary during zooming, wherein the first lens unit comprises a front lens sub-unit including at least one positive lens and having a negative refractive power as a whole, an intermediate lens sub-unit including at least one positive lens and a cemented lens and having a positive refractive power as a whole, and a rear lens sub-unit including a cemented lens and having a positive refractive power as a whole, and wherein the intermediate lens sub-unit is moved toward the image side to effect focusing from an infinitely distant object to an object at a minimum object distance.

BRIEF DESCRIPTION OF THE DRAWINGS

In the block diagrams, L1 denotes the first lens unit, L2 denotes the second lens unit, L3 denotes the third lens unit, L11 denotes the front lens sub-unit, L12 denotes the intermediate lens sub-unit, and L13 denotes the rear lens sub-unit. SP stands for the stop, and P stands for the glass block.

In the aberration curves, e-LINE stands for the spectral e-line, g-LINE stands for the spectral g-line, ΔM stands for the meridional image plane, and ΔS stands for the sagittal image plane.

DETAILED DESCRIPTION OF THE PREFERRED EMBODIMENTS

Figure 1:
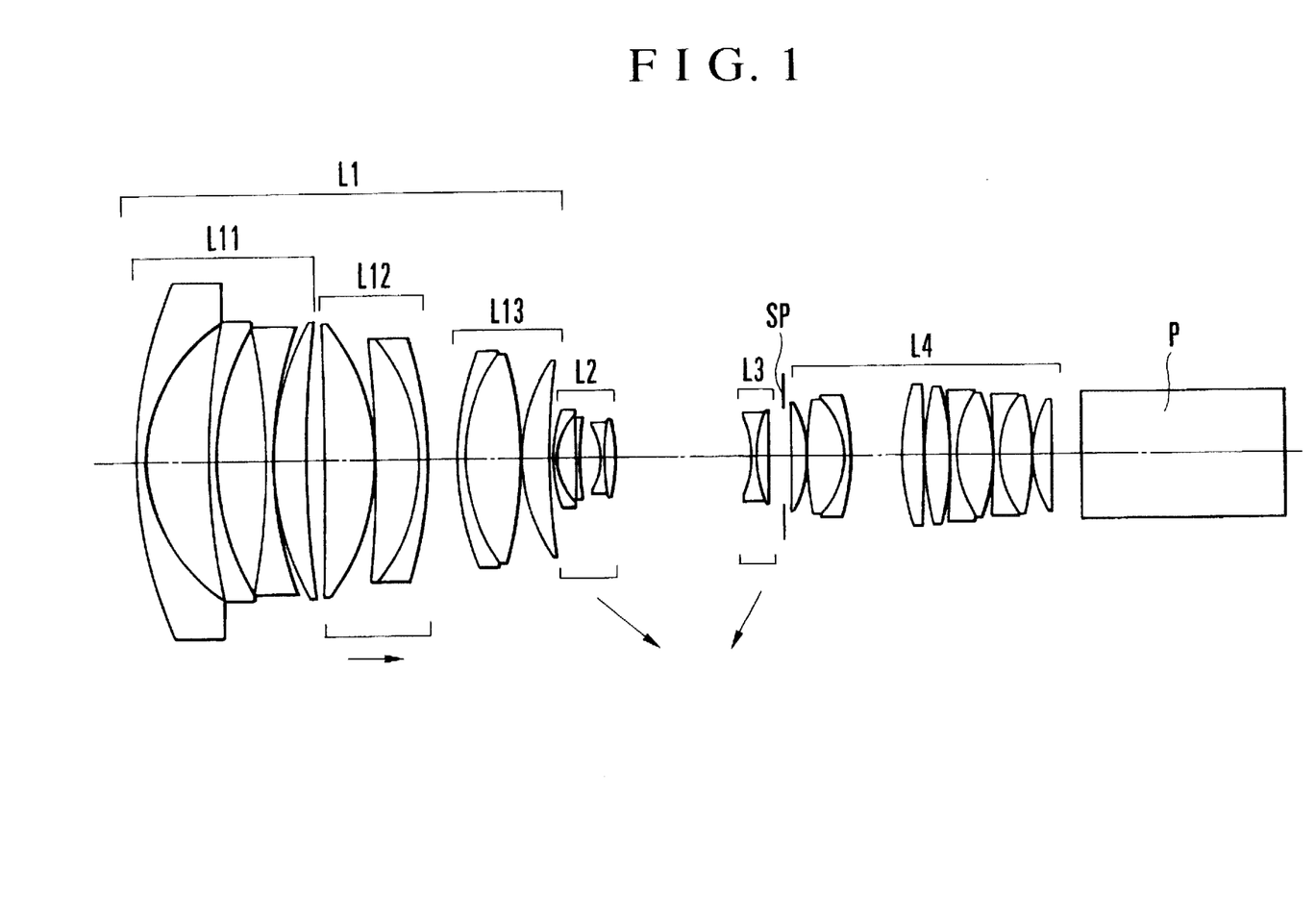
FIG. 1 is a longitudinal section view of a numerical example 1 of a zoom lens of the invention in the wide-angle end.
Figure 2:
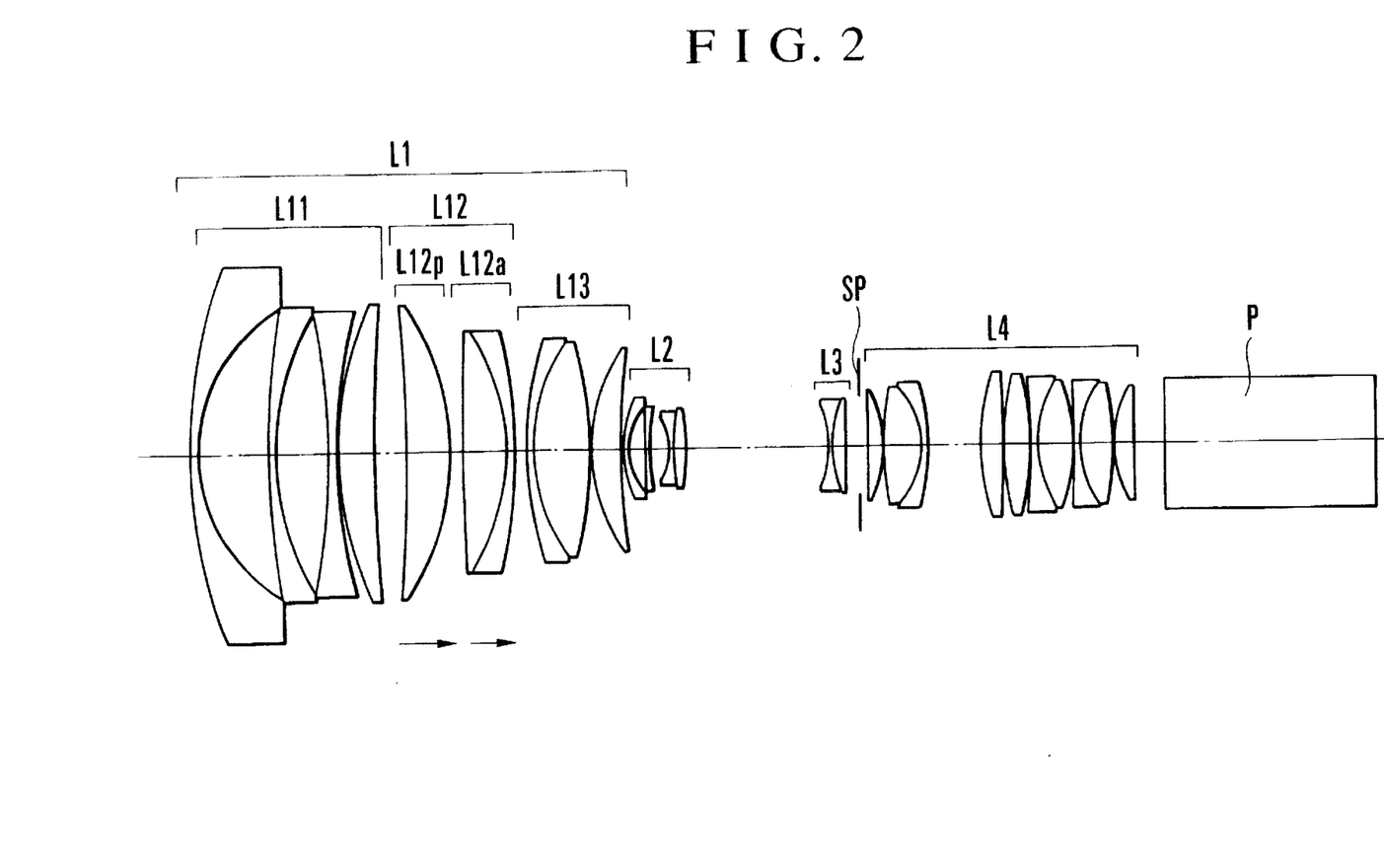
FIG. 2 is a longitudinal section view of a numerical example 2 of a zoom lens of the invention in the wide-angle end.
Figure 3:
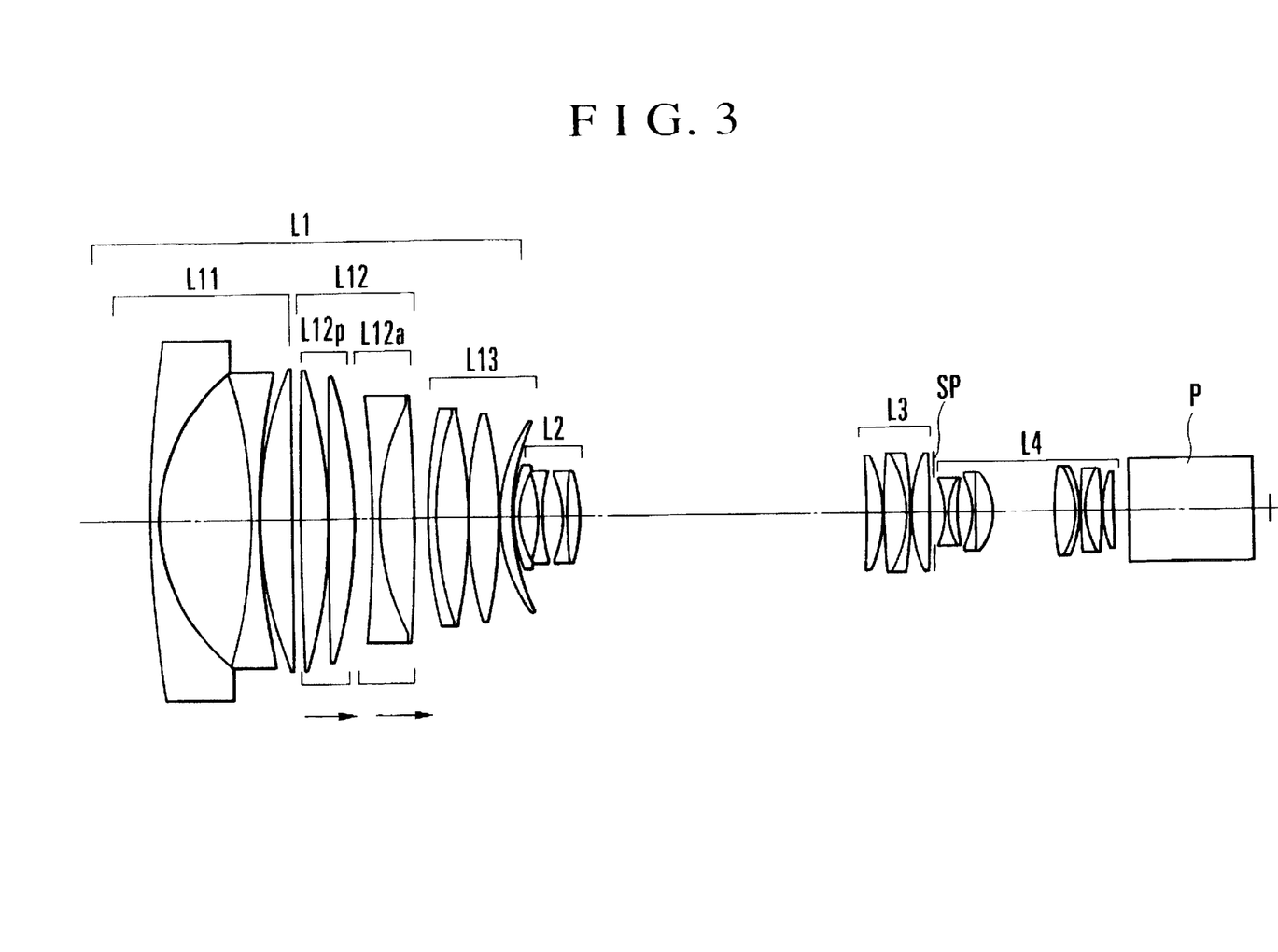
FIG. 3 is a longitudinal section view of a numerical example 3 of a zoom lens of the invention in the wide-angle end.
Figure 4A:
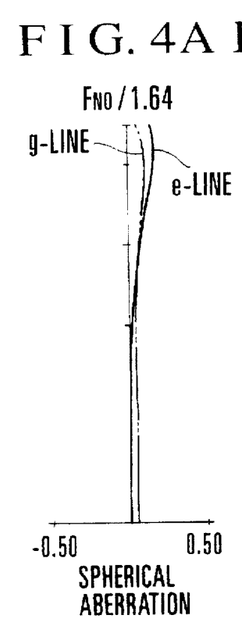
FIGS. 4A, 4B, 4C and 4D are graphic representations of the aberrations of the numerical example 1 of the invention in the telephoto end with an object at infinity.
Figure 4B:
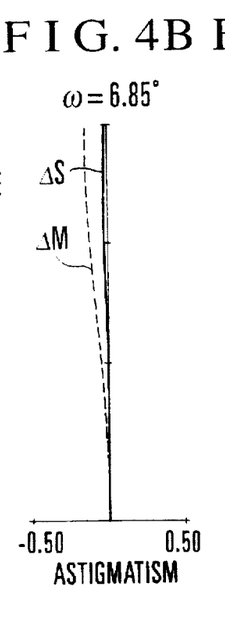
Figures 4C, 4D:
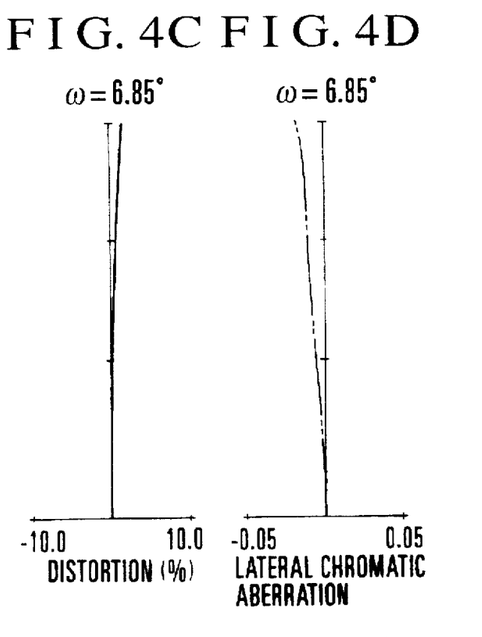
Figure 5A:
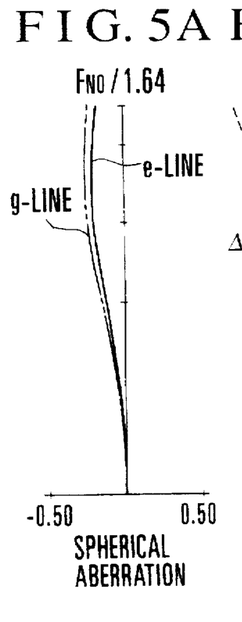
FIGS. 5A, 5B, 5C and 5D are graphic representations of the aberrations of the numerical example 1 of the invention in the telephoto end with an object at the minimum distance.
Figure 5B:
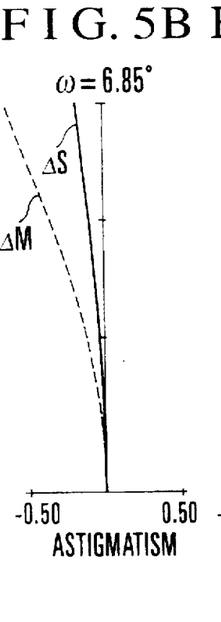
Figure 5C:
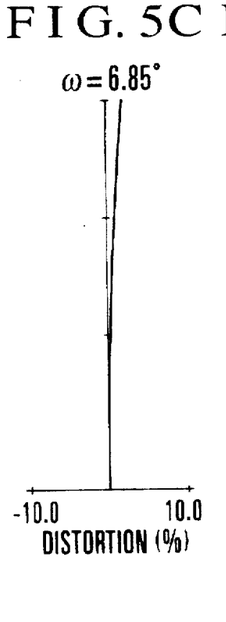
Figure 5D:
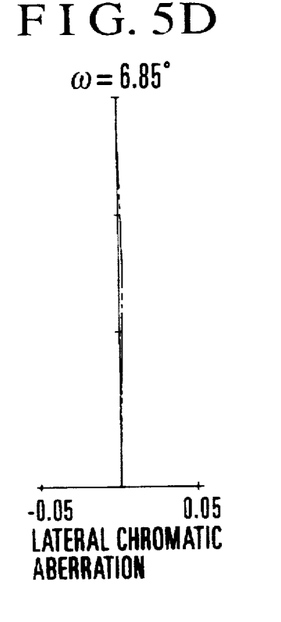
Figure 6:
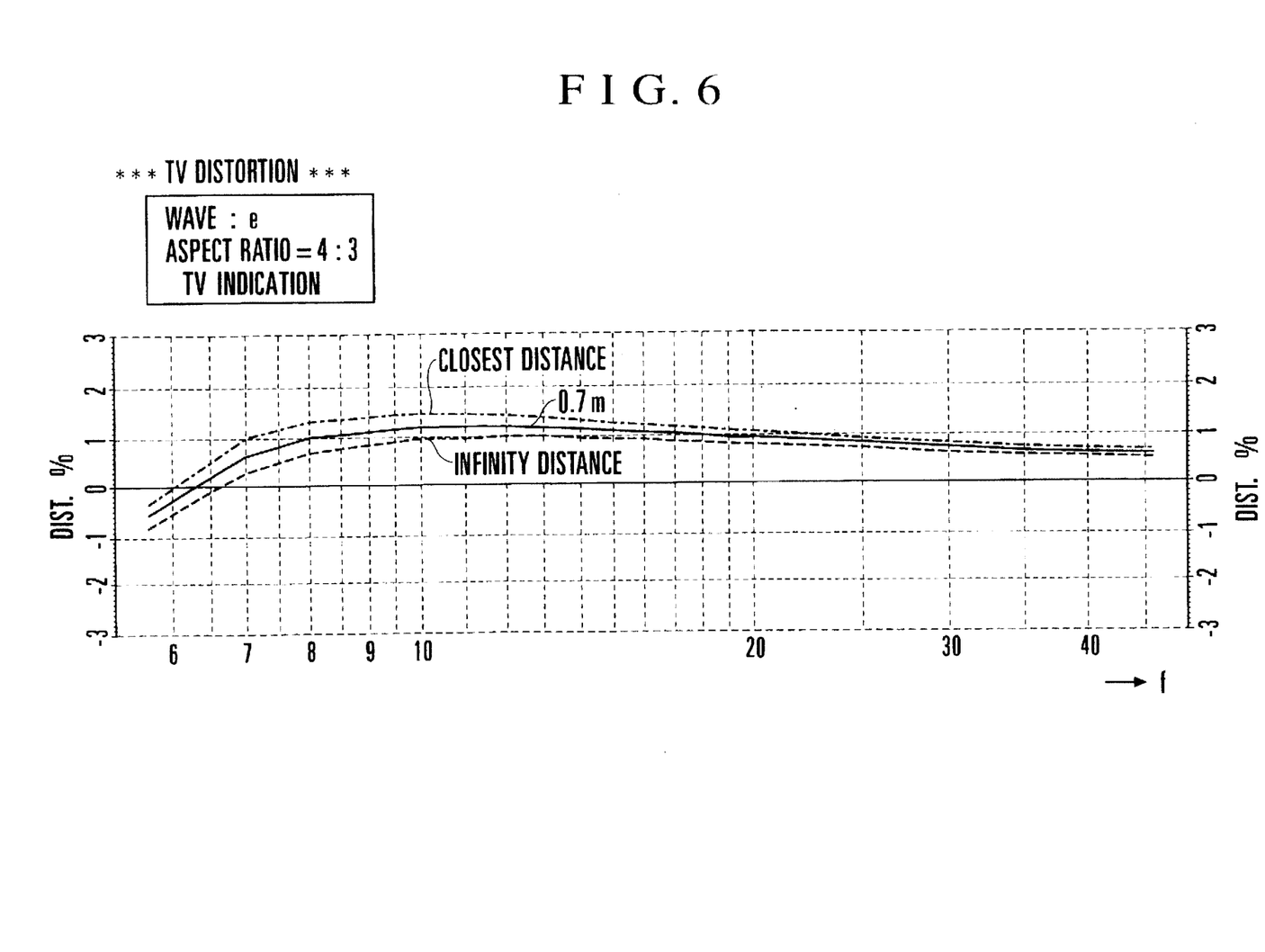
FIG. 6 is a graph showing the variation of distortion with variation of magnification in the numerical example 1 of the invention.
Figure 7A:
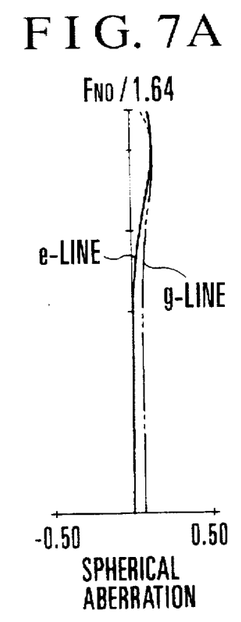
FIGS. 7A, 7B, 7C and 7D are graphic representations of the aberrations of the numerical example 2 of the invention in the telephoto end with an object at infinity.
Figure 7B:
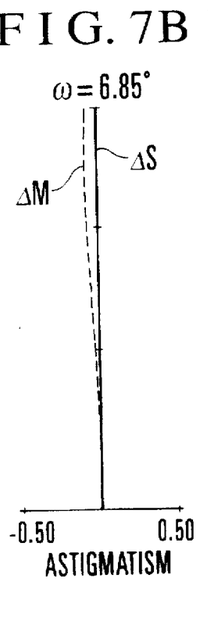
Figure 7C:
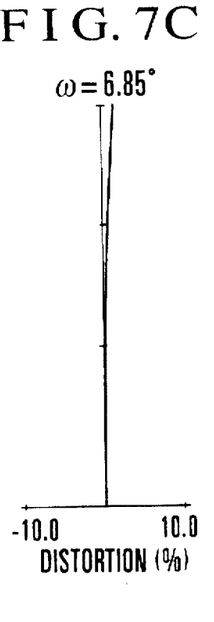
Figure 7D:
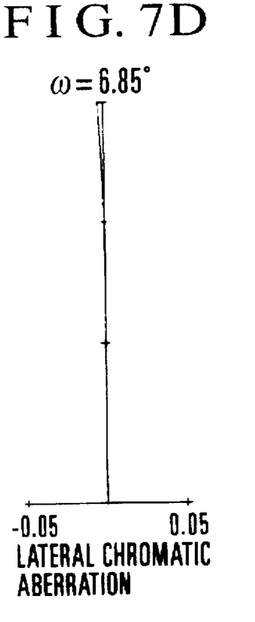
Figures 8A, 8B:
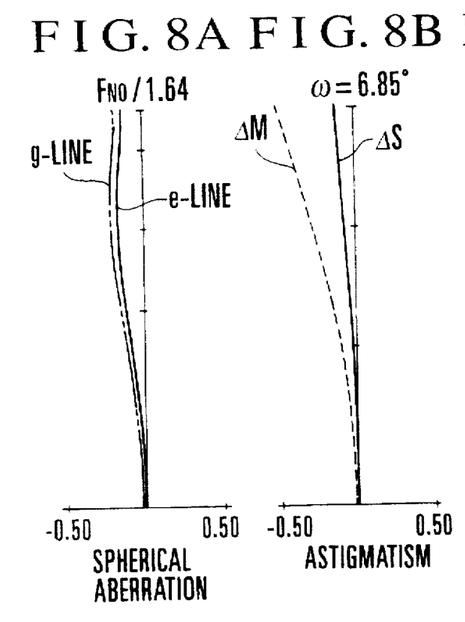
FIGS. 8A, 8B, 8C and 8D are graphic representations of the aberrations of the numerical example 2 of the invention in the telephoto end with an object at the minimum distance.
Figure 8C:
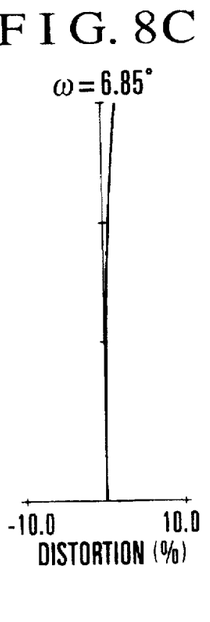
Figure 8D:
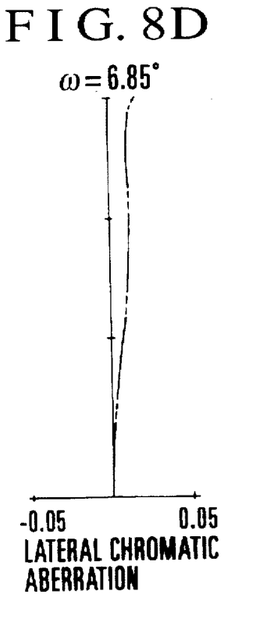
Figure 9:
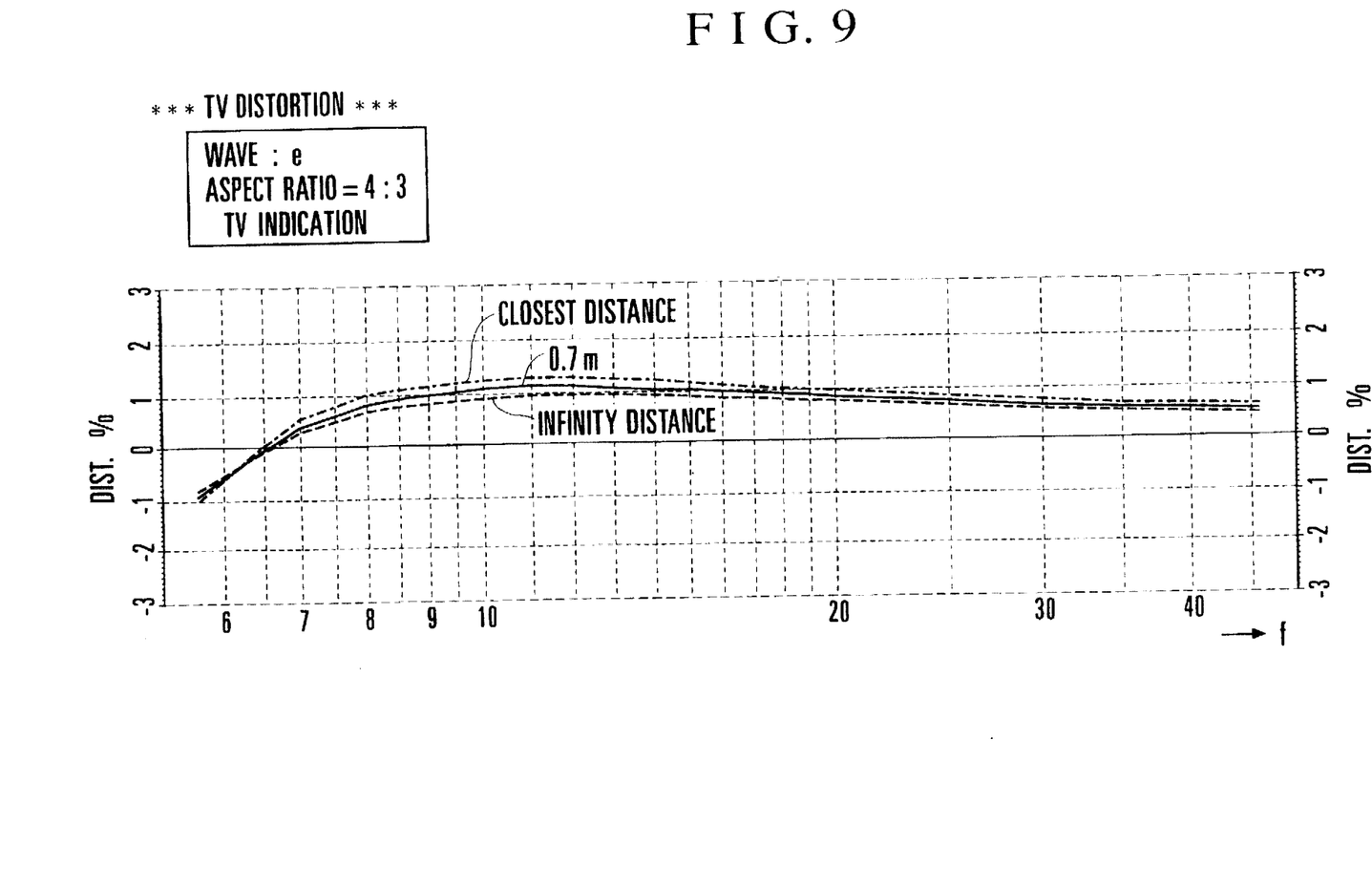
FIG. 9 is a graph of the variation of distortion with variation of magnification in the numerical example 2 of the invention.
Figure 10A:
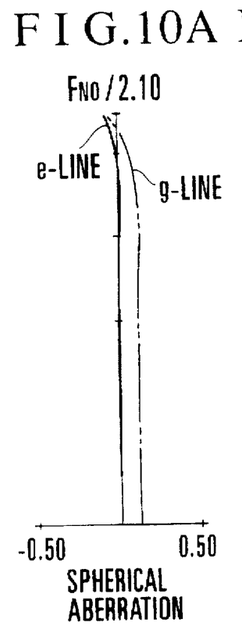
FIGS. 10A, 10B, 10C and 10D are graphic representations of the aberrations of the numerical example 3 of the invention in the telephoto end with an object at infinity.
Figure 10B:
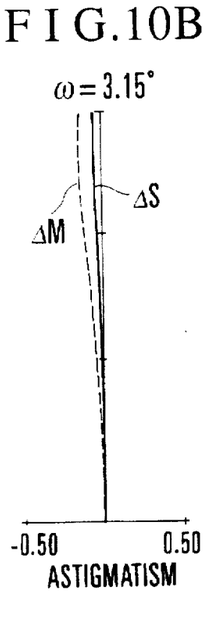
Figure 10C:
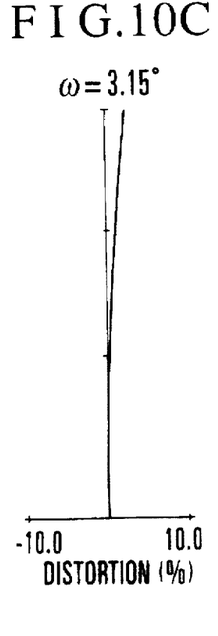
Figure 10D:
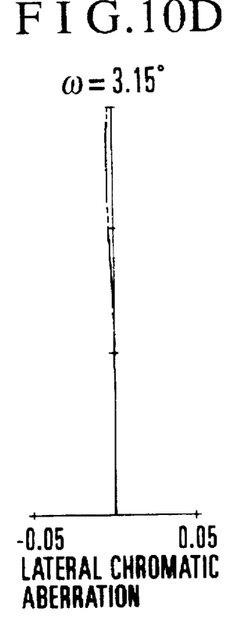
Figure 11A:
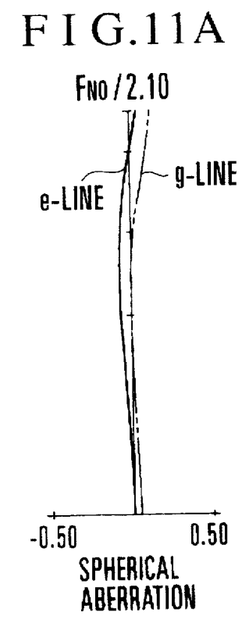
FIGS. 11A, 11B, 11C and 11D are graphic representations of the aberrations of the numerical example 3 of the invention in the telephoto end with an object at the minimum distance.
Figure 11B:
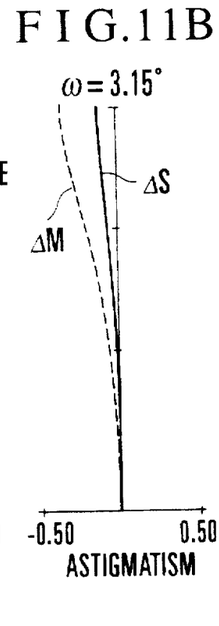
Figure 11C:
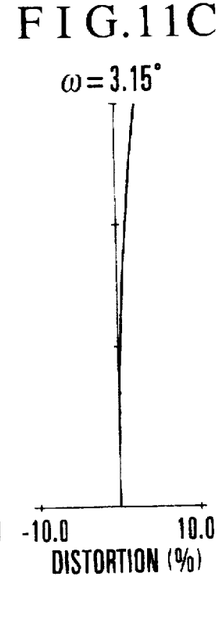
Figure 11D:
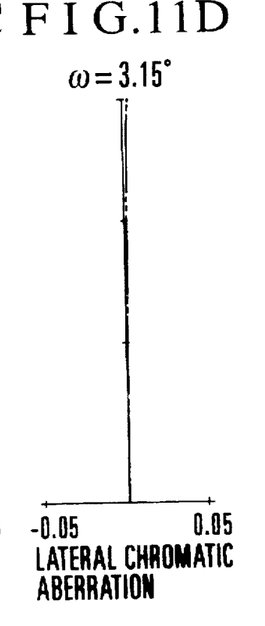
Figure 12:
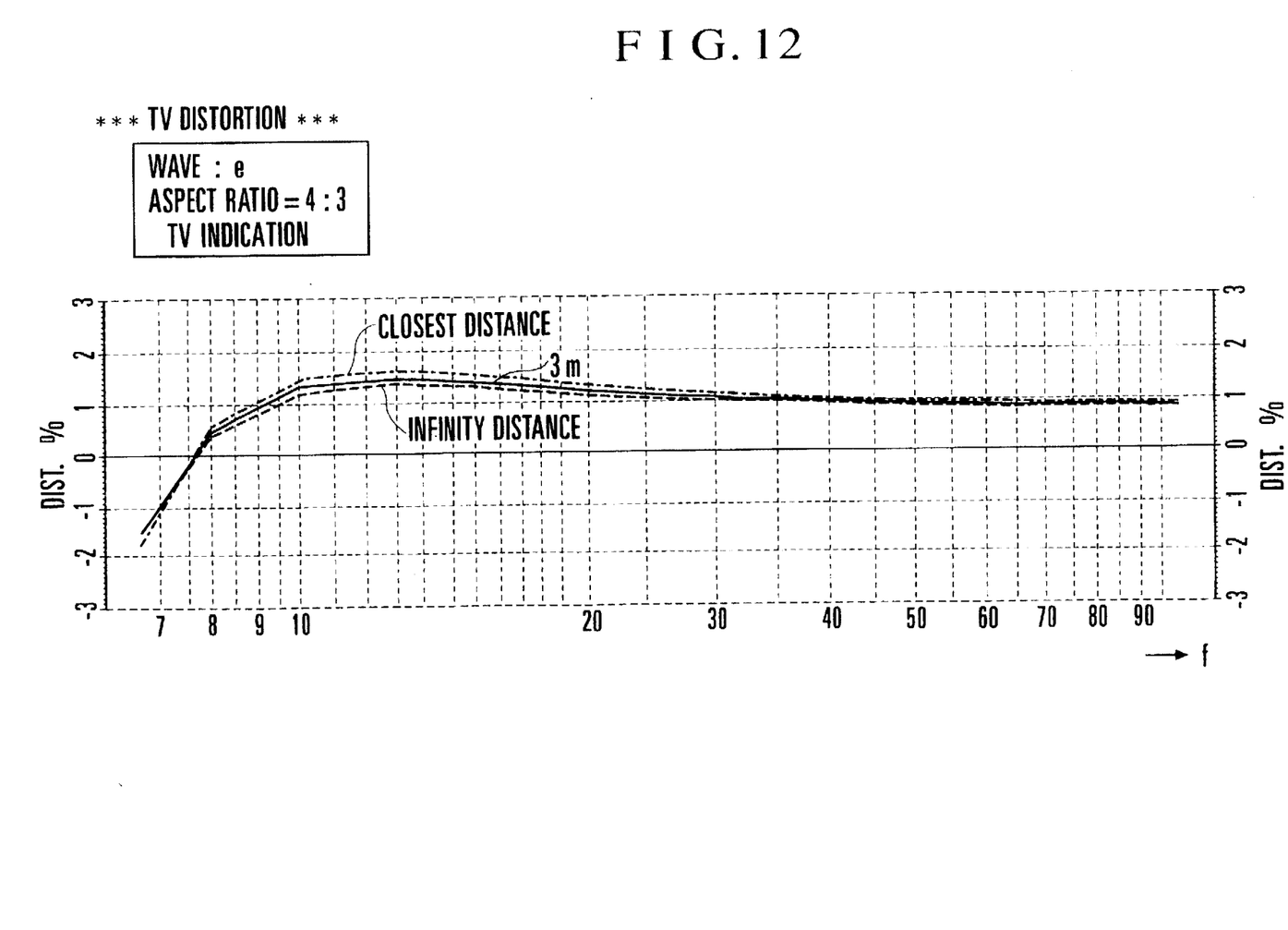
FIG. 12 is a graph of the variation of distortion with variation of magnification in the numerical example 3 of the invention.

FIGS. 1, 2 and 3 in block diagrams show numerical examples 1, 2 and 3 of zoom lenses of the invention in the wide-angle end, respectively.

In these figures, reference character L1 denotes a first lens unit, called the "focusing" (or "front") lens unit, of positive refractive power which remains stationary during zooming. The first lens unit L1 is constructed with a front lens sub-unit L11 including at least one positive lens and having a negative refractive power as a whole, an intermediate lens sub-unit L12 including at least one positive lens and a cemented lens and having a positive refractive power as a whole, and a rear lens sub-unit L13 including a cemented lens and having a positive refractive power as a whole. Focusing from an infinitely distant object to an object at the minimum distance is effected, in FIG. 1, by moving the intermediate lens sub-unit L12 as a whole toward the image side.

Alternatively, in FIGS. 2 and 3, the intermediate lens sub-unit L12 is divided into two parts, of which the front part L12p comprises one or two positive lenses and the rear part L12a comprises a cemented lens, and the front part L12p and the rear part L12a are moved by respective different distances toward the image side. That is, the floating technique is utilized.

Reference character L2 denotes a second lens unit for varying magnification, called the "variator" lens unit, of negative refractive power. Zooming from the wide-angle end to the telephoto end is effected by axially moving the second lens unit L2 toward the image side monotonously. Note that the second lens unit L2, during zooming, varies the image magnification within a range including unity magnification (−1×).

Reference character L3 denotes a third lens unit, called the "compensator" lens unit, of positive or negative refractive power. To compensate for the image shift with zooming, it is in the case of the negative refractive power that the third lens unit L3 moves while depicting a locus convex toward the object side. In the case of the positive refractive power, the third lens unit L3 moves toward the object side monotonously. SP stands for a stop.

Reference character L4 denotes a fourth lens unit, called the "relay lens" unit, of positive refractive power. P stands for a color separation prism, optical filters and others which are shown as a glass block in the same figures.

In general, the 4-unit type of zoom lens is combined with the so-called front focusing method in which the frontmost or first lens unit as a whole is moved for focusing. The front focusing method has an advantage that the lens mounting mechanism is simple in structure, because the focusing movement of the first lens unit is constant at every focal length for an equivalent object distance.

For the telephoto region, however, during focusing, the optical performance, especially with respect to spherical aberration and longitudinal chromatic aberration, is varied to a large extent. This is not favorable for shortening the minimum object distance. Moreover, it becomes difficult to correct the image aberrations well throughout the entire area of the image frame.

Therefore, according to the invention, within the framework of the zoom lens configuration described above, the focusing range is extended toward shorter object distances. For this purpose, the "inner" focusing method is employed, in which, in a numerical example 1 shown in FIG. 1, the intermediate lens sub-unit L12 included in the first lens unit L1 is moved toward the image side for focusing from an infinitely distant object to an object at the minimum distance, thus assuring maintenance of a good stability of optical performance.

In numerical examples 2 and 3 shown in FIGS. 2 and 3, the intermediate lens sub-unit L12 included in the first lens unit L1 is divided into two parts L12p and L12a, as described above. The two parts L12p and L12a are then made to move by respective different distances. By employing such a floating technique, an improvement of the optical performance is facilitated.

That is, any one of the air spaces in the lens sub-unit which moves for focusing is made to increase or decrease as the object distance varies. Since this floating causes a change of the slopes and heights of the rays passing through the refracting surfaces, the variation of aberrations is corrected well.

The features or conditions described above suffice for accomplishing the zoom lens according to the invention. To achieve much desired increases of the aperture ratio and of the variable magnification ratio, while still permitting a good stability of optical performance to be maintained throughout the entire focusing range by employing the inner focusing method, it is preferable to satisfy at least one of the following conditions (I-1) and (I-2).

(I-1) The front lens sub-unit has at least one negative lens, the cemented lens included in the intermediate lens sub-unit has a positive lens L12ap and a negative lens L12an, and the cemented lens included in the rear lens sub-unit has a negative lens L13an and a positive lens L13ap, and where a refractive index for the spectral e-line and an Abbe number of a material of the negative lens included in the front lens sub-unit are denoted by N11n and v11n, respectively, a refractive power and an Abbe number of a material of a k-th lens (k=1, 2, . . . ) included in the front lens sub-unit are denoted by $\phi 11k$ and v11k, respectively, a refractive power of the front lens sub-unit is denoted by $\phi 11$, a refractive power of a cemented surface of the cemented lens included in the intermediate lens sub-unit is denoted by $\phi 12aa$, an Abbe number of a material of the negative lens L12an is denoted by v12an, a refractive power and an Abbe number of a material of a k-th lens (k=1, 2, . . . ) included in the intermediate lens sub-unit are denoted by $\phi 12k$ and v12k, respectively, a refractive power of the intermediate lens sub-unit is denoted by $\phi 12$, a refractive power of a cemented surface of the cemented lens included in the rear lens sub-unit is denoted by $\phi 13aa$, an Abbe number of a material of the negative lens L13an is denoted by v13an, a refractive power and an Abbe number of a material of a k-th lens (k=1, 2, . . . ) included in the rear lens sub-unit are denoted by $\phi 13k$ and v13k, respectively, and a refractive power of the rear lens sub-unit is denoted by $\phi 13$, the following conditions are satisfied:

$$1.60 < \nu 11n \quad (1)$$

$$49 < \nu 11n \quad (2)$$

$$0.008 < \Sigma \left( \frac{\phi 11k}{\nu 11k} \right) / \phi 11 < 0.01 \quad (3)$$

$$-0.9 < \phi 12aa/\phi 12 < -0.6 \quad (4)$$

$$25 < \nu 12an < 51 \quad (5)$$

$$-0.008 < \Sigma \left( \frac{\phi 12k}{\nu 12k} \right) / \phi 12 < -0.001 \quad (6)$$

$$-0.4 < \phi 13aa/\phi 13 < -0.3 \quad (7)$$

$$20 < \nu 13an < 40 \quad (8)$$

$$0.003 < \Sigma \left( \frac{\phi 13k}{\nu 13k} \right) / \phi 13 < 0.01. \quad (9)$$

To achieve a great increase of the maximum field angle, the invention gives an important role to the front lens sub-unit in the first lens unit. In this respect, a number of negative lenses are included in the front lens sub-unit. Moreover, the rays which are to reach the corners of the image frame pass through the rim of the aperture. For this reason, the tendency to produce distortion and lateral chromatic aberration is intensified. To avoid this, the inequalities of conditions (1), (2) and (3) are set forth to lay limitations on the negative lenses. When the lower limit of the condition (1) is exceeded, the negative distortion in the wide-angle end becomes too large to correct with ease. When the lower limit of the condition (2) is exceeded, large lateral chromatic aberration is produced, which is difficult to correct. The inequalities of condition (3) gives a range for the state of achromatism in the entire front lens sub-unit. When this condition is violated, it becomes difficult to correct chromatic aberrations well.

The introduction of the cemented lens into the intermediate lens sub-unit produces an effect of preventing the longitudinal chromatic aberration from becoming corrected negative when focusing is effected down to shorter object distances. At the same time, this cemented lens cooperates with another cemented lens, which is included in the rear lens sub-unit, to correct spherical aberration and longitudinal chromatic aberration for the telephoto end and distortion and lateral chromatic aberration for the wide-angle end. The conditions (4) to (9) are set forth in order to insure that all of these aberrations are corrected well. Of these, the conditions (4) and (7) are concerned with correction mainly of spherical aberration and distortion. The conditions (5), (6), (8) and (9) are concerned with correction mainly of chromatic aberrations.

When the upper limit of the condition (4) is exceeded, a large change of spherical aberration to negative correction results in the telephoto end with an object at the minimum distance. When the lower limit is exceeded, the variation of distortion with focusing becomes larger and the total focusing movement increases objectionably.

When the upper limit of the condition (7) is exceeded, correction of pincushion type distortion becomes insufficient in the wide-angle region. When the lower limit is exceeded, the spherical aberration for the telephoto side is over-corrected throughout the entire focusing range.

The inequalities of condition (5) or (8) are concerned with the Abbe number of the material of the negative lens used in the cemented lens. When the Abbe numbers of both inequalities take larger values than the upper limits at once, the effect of preventing the longitudinal chromatic aberration from changing to negative correction at the minimum object distance becomes weaker. Besides this, correction of the longitudinal chromatic aberration for the telephoto end changes to negative one. When the lower limit is exceeded, the lateral chromatic aberration for the wide-angle end is under-corrected. Besides this, the longitudinal chromatic aberration for the telephoto end is over-corrected objectionably.

The conditions (6) and (9) have an aim to achromatize the combined system of the intermediate lens sub-unit and rear lens sub-unit. When the upper limit or lower limit of any one of the conditions (6) and (9) is exceeded, it becomes difficult to correct the variation of chromatic aberrations with focusing.

(I-2) The intermediate lens sub-unit comprises a lens L12p composed of one or two positive lens elements and a lens L12a composed of one cemented lens, and where amounts of movement of the lens L12p and the lens L12a during focusing from an infinitely distant object to an object at a minimum distance are denoted by M12p and M12a, respectively, the following condition is satisfied:

$$M12a < M12p \quad (10).$$

According to the invention, by employing the floating method which satisfies the condition (10), the variation of aberrations, mainly distortion, with focusing is remarkably lessened in the wide-angle region.

Figure 14:
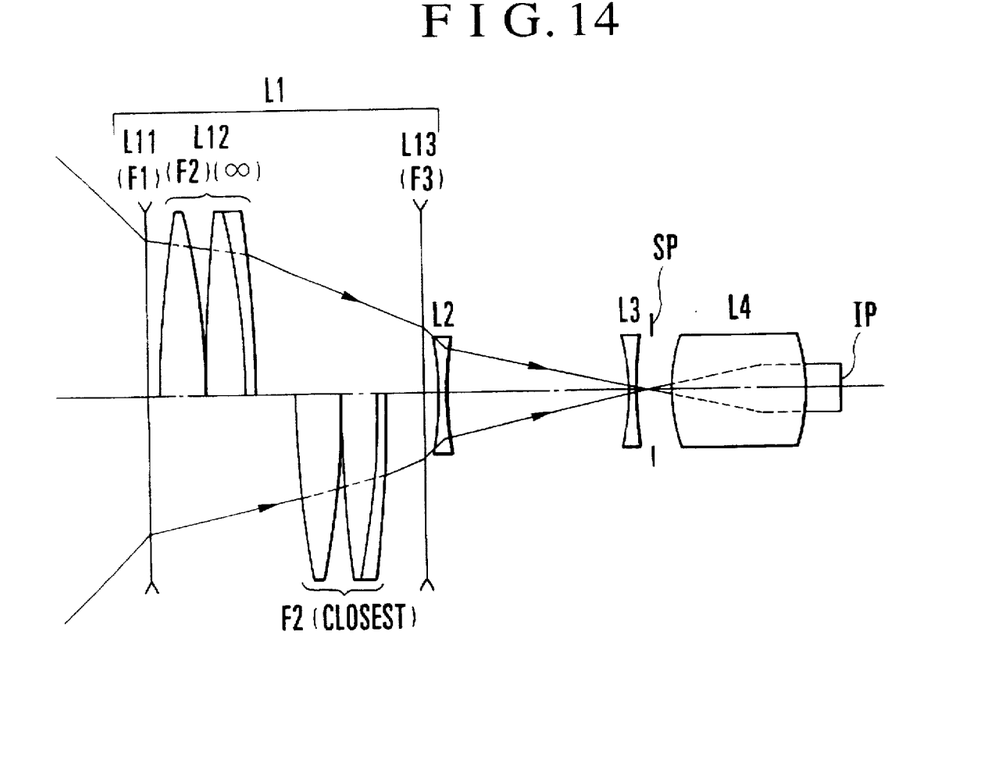
FIG. 14 is a diagram of geometry for explaining the difference between the heights of incidence of the ray on the first lens unit of the 4-unit zoom lens in the wide-angle end with an object at infinity and at the minimum distance.

At first, the reason for the variation of distortion with focusing is explained. FIG. 14 shows a pair of rays which go to the corners of the image frame in the wide-angle end with an infinitely distant object and an object at the minimum distance under the condition that the positive single lens and the cemented lens are unified to form the intermediate lens sub-unit. In FIG. 14, the upper half relative to an optical axis is shown as focused on the infinitely distance object, and the lower half relative to the optical axis is shown as focused on the object at the minimum distance.

With the setting in the wide-angle end, the ray from an extraaxial object point has a large angle of inclination in the space between the front lens sub-unit and rear lens sub-unit, and is incident on the rear lens sub-unit at a low height. Therefore, the height at which the ray passes through the intermediate lens sub-unit changes largely between when focused on the infinitely distant object and when on the object at the minimum distance. This is the cause of bringing forth the variation of distortion with focusing. The cemented surface of large refractive power in the intermediate lens sub-unit has an effect of getting distortion to minus. As focusing goes on from an infinitely distant object for which the height of incidence is high to an object at the minimum distance for which the height of incidence is low, the distortion changes to plus side greatly. As the focal length varies to the telephoto side, on the other hand, the angle of inclination of the extraaxial ray decreases to decrease the difference between the heights of incidence of the ray on the front lens sub-unit and the rear lens sub-unit. Therefore, the variation of distortion with focusing becomes very small.

Accordingly, in the present embodiment, the floating method that satisfies the condition (10) is employed to reduce the range of variation of distortion for the wide-angle region with focusing. In particular, most of the focusing function is performed by the lens L12p, while the cemented lens L12a moves a little toward the image side. This produces an effect that the prevention of variation of the longitudinal chromatic aberration for the telephoto end is reflected to reduction of the variation of even the distortion for the wide-angle region. In this connection, it should be noted that the locus of motion for the cemented lens L12a may be either linear as its speed is constant relative to that of movement of the lens L12p, or non-linear as its speed is accelerated or decelerated.

Next, the numerical examples 1 to 3 of the invention are shown. In the numerical data for the examples 1 to 3, Ri is the radius of curvature of the i-th lens surface, when counted from the object side, Di is the i-th axial thickness or air separation, when counted from the object side, and Ni and vi are respectively the refractive index for the spectral e-line and the Abbe number of the glass of the i-th lens element, when counted from the object side.

The values of the factors in the above-described conditions for the numerical examples 1 to 3 are listed in Table-1.

In the numerical example 1 of FIG. 1, the zoom lens has a zoom ratio of 8 with the focal length in the wide-angle end fw=5.72 [mm] and can be focused on an object at a minimum distance of 300 [mm]. The intermediate lens sub-unit L12 for focusing comprises a positive lens and a cemented lens composed of positive and negative lenses, to correct the variation of aberrations with focusing. Particularly for the telephoto side, the variation of longitudinal chromatic aberration is corrected well.

In the numerical example 2 of FIG. 2, the zoom lens has a zoom ratio of 8 with the focal length in the wide-angle end fw=5.72 [mm] and can be focused on an object at a minimum distance of 300 [mm]. The intermediate lens sub-unit L12 for focusing is divided into two parts, i.e., a positive lens L12p and a cemented lens L12a. Both lenses L12p and L12a are made to move by respective different distances for focusing, that is, the floating method is employed, to correct well the variation of mainly distortion with focusing.

In the numerical example 3 of FIG. 3, the zoom lens has a zoom ratio of 14.9 with the focal length in the wide-angle end fw=6.7 [mm] and can be focused on an object at a minimum distance of 1000 [mm]. The intermediate lens sub-unit L12 comprises a lens L12p composed of two positive lenses and a cemented lens L12a, totaling four lens elements, and, further, the floating method is used to correct well the spherical aberration and longitudinal chromatic aberration for the telephoto end.

(NUMERICAL EXAMPLE 1)

Zoom Ratio = 8   fw = 5.72   Fno = 1:1.64
Image Diagonal = 11.0   $2\omega = 87.75°-13.70°$

| R1 = 130.92 | D1 = 2.40 | N1 = 1.77621 | v1 = 49.6 |
| R2 = 45.54 | D2 = 17.31 | | |
| R3 = 208.24 | D3 = 2.00 | N2 = 1.60548 | v2 = 60.7 |
| R4 = 72.64 | D4 = 13.60 | | |
| R5 = −195.54 | D5 = 2.00 | N3 = 1.62287 | v3 = 60.3 |
| R6 = 100.54 | D6 = 0.20 | | |
| R7 = 78.63 | D7 = 8.94 | N4 = 1.76168 | v4 = 27.5 |
| R8 = 284.3 | D8 = Variable | | |
| R9 = −1577.22 | D9 = 12.92 | N5 = 1.48915 | v5 = 70.2 |
| R10 = −67.35 | D10 = 0.20 | | |
| R11 = −438.90 | D11 = 12.63 | N6 = 1.48915 | v6 = 70.2 |
| R12 = −51.45 | D12 = 2.20 | N7 = 1.76168 | v7 = 27.5 |
| R13 = −108.76 | D13 = Variable | | |
| R14 = 82.05 | D14 = 2.20 | N8 = 1.83932 | v8 = 37.2 |
| R15 = 50.22 | D15 = 15.40 | N9 = 1.49845 | v9 = 81.6 |
| R16 = −97.83 | D16 = 0.20 | | |
| R17 = 48.52 | D17 = 7.61 | N10 = 1.62287 | v10 = 60.3 |
| R18 = 200.20 | D18 = Variable | | |
| R19 = 36.08 | D19 = 1.00 | N11 = 1.88814 | v11 = 40.8 |
| R20 = 17.09 | D20 = 5.27 | | |
| R21 = −587.42 | D21 = 0.80 | N12 = 1.80811 | v12 = 46.6 |
| R22 = 65.75 | D22 = 5.92 | | |

-continued

| R23 = −16.84 | D23 = 0.80 | N13 = 1.77621 | v13 = 49.6 |
| R24 = 58.45 | D24 = 3.17 | N14 = 1.93306 | v14 = 21.3 |
| R25 = −46.18 | D25 = Variable | | |
| R26 = −26.19 | D26 = 0.90 | N15 = 1.77621 | v15 = 49.6 |
| R27 = 29.28 | D27 = 3.70 | N16 = 1.81265 | v16 = 25.4 |
| R28 = −786.13 | D28 = Variable | | |
| R29 = (Stop) | D29 = 2.30 | | |
| R30 = −369.12 | D30 = 3.88 | N17 = 1.53532 | v17 = 45.9 |
| R31 = −34.18 | D31 = 0.15 | | |
| R32 = 95.17 | D32 = 10.11 | N18 = 1.57392 | v18 = 53.0 |
| R33 = −22.01 | D33 = 1.50 | N19 = 1.88814 | v19 = 40.8 |
| R34 = −57.56 | D34 = 14.00 | | |
| R35 = 63.62 | D35 = 6.20 | N20 = 1.50349 | v20 = 56.4 |
| R36 = −241.89 | D36 = 0.15 | | |
| R37 = 88.50 | D37 = 6.90 | N21 = 1.50349 | v21 = 56.4 |
| R38 = −68.21 | D38 = 0.15 | | |
| R39 = −172.36 | D39 = 1.75 | N22 = 1.88814 | v22 = 40.8 |
| R40 = 34.18 | D40 = 9.40 | N23 = 1.50229 | v23 = 66.0 |
| R41 = −52.47 | D41 = 0.15 | | |
| R42 = −261.12 | D42 = 1.60 | N24 = 1.83932 | v24 = 37.2 |
| R43 = 28.10 | D43 = 8.70 | N25 = 1.48915 | v25 = 70.2 |
| R44 = −64.42 | D44 = 0.15 | | |
| R45 = 31.76 | D45 = 5.00 | N26 = 1.51356 | v26 = 51.0 |
| R46 = ∞ | D46 = 8.27 | | |
| R47 = ∞ | D47 = 55.50 | N27 = 1.51825 | v27 = 64.2 |
| R48 = ∞ | | | |

| Variable | Focal Length [mm] | | | | |
|---|---|---|---|---|---|
| Separations | 5.72 | 10.30 | 22.88 | 34.32 | 45.77 |
| D18 | 0.91 | 15.39 | 28.79 | 33.58 | 36.28 |
| D25 | 37.52 | 20.99 | 6.46 | 2.86 | 2.15 |
| D28 | 3.76 | 5.81 | 6.94 | 5.75 | 3.76 |

| Variable | Object Distance [mm] | | | | |
|---|---|---|---|---|---|
| Separations | ∞ | −3000 | −700 | −500 | *Min. |
| D8 | 4.13 | 4.96 | 7.47 | 8.66 | 11.18 |
| D13 | 8.88 | 8.05 | 5.54 | 4.35 | 1.83 |

*Min. for Minimum Object Distance at − 300.

(NUMERICAL EXAMPLE 2)

Zoom Ratio = 8   fw = 5.72   Fno = 1:1.64
Image Diagonal = 11.0   $2\omega = 87.75°-13.70°$

| R1 = 130.00 | D1 = 2.40 | N1 = 1.77621 | v1 = 49.6 |
| R2 = 45.16 | D2 = 18.28 | | |
| R3 = 226.01 | D3 = 2.00 | N2 = 1.60548 | v2 = 60.7 |
| R4 = 72.97 | D4 = 14.50 | | |
| R5 = −163.12 | D5 = 2.00 | N3 = 1.62287 | v3 = 60.3 |
| R6 = 136.14 | D6 = 0.20 | | |
| R7 = 87.67 | D7 = 9.91 | N4 = 1.76168 | v4 = 27.5 |
| R8 = 526.04 | D8 = Variable | | |
| R9 = −485.31 | D9 = 11.86 | N5 = 1.48915 | v5 = 70.2 |
| R10 = −70.82 | D10 = Variable | | |
| R11 = 1066.75 | D11 = 11.61 | N6 = 1.48915 | v6 = 70.2 |
| R12 = −56.76 | D12 = 2.20 | N7 = 1.76168 | v7 = 27.5 |
| R13 = −127.07 | D13 = Variable | | |
| R14 = 90.54 | D14 = 2.20 | N8 = 1.83932 | v8 = 37.2 |
| R15 = 51.89 | D15 = 15.00 | N9 = 1.49845 | v9 = 81.6 |
| R16 = −99.01 | D16 = 0.20 | | |
| R17 = 46.95 | D17 = 7.59 | N10 = 1.62287 | v10 = 60.3 |
| R18 = 167.42 | D18 = Variable | | |
| R19 = 32.57 | D19 = 1.00 | N11 = 1.88814 | v11 = 40.8 |
| R20 = 16.77 | D20 = 4.88 | | |
| R21 = −1035.62 | D21 = 0.80 | N12 = 1.80811 | v12 = 46.6 |
| R22 = 55.58 | D22 = 5.59 | | |
| R23 = −16.86 | D23 = 0.80 | N13 = 1.77621 | v13 = 49.6 |
| R24 = 63.89 | D24 = 3.14 | N14 = 1.93306 | v14 = 21.3 |
| R25 = −47.18 | D25 = Variable | | |
| R26 = −26.19 | D26 = 0.90 | N15 = 1.77621 | v15 = 49.6 |
| R27 = 29.28 | D27 = 3.70 | N16 = 1.81265 | v16 = 25.4 |
| R28 = −786.13 | D28 = Variable | | |

-continued

| | | | |
|---|---|---|---|
| R29 = (Stop) | D29 = 2.30 | | |
| R30 = -369.12 | D30 = 3.88 | N17 = 1.53532 | v17 = 45.9 |
| R31 = -34.18 | D31 = 0.15 | | |
| R32 = 95.17 | D32 = 10.11 | N18 = 1.57392 | v18 = 53.0 |
| R33 = -22.01 | D33 = 1.50 | N19 = 4.88814 | v19 = 40.8 |
| R34 = -57.56 | D34 = 14.00 | | |
| R35 = 63.62 | D35 = 6.20 | N20 = 1.50349 | v20 = 56.4 |
| R36 = -241.89 | D36 = 0.15 | | |
| R37 = 88.50 | D37 = 6.90 | N21 = 1.50349 | v21 = 56.4 |
| R38 = -68.21 | D38 = 0.15 | | |
| R39 = -172.36 | D39 = 1.75 | N22 = 1.88814 | v22 = 40.8 |
| R40 = 34.18 | D40 = 9.40 | N23 = 1.50229 | v23 = 66.0 |
| R41 = -52.47 | D41 = 0.15 | | |
| R42 = -261.12 | D42 = 1.60 | N24 = 1.83932 | v24 = 37.2 |
| R43 = 28.10 | D43 = 8.70 | N25 = 1.48915 | v25 = 70.2 |
| R44 = -64.42 | D44 = 0.15 | | |
| R45 = 31.76 | D45 = 5.00 | N26 = 1.51356 | v26 = 51.0 |
| R46 = ∞ | D46 = 8.27 | | |
| R47 = ∞ | D47 = 55.50 | N27 = 1.51825 | v27 = 64.2 |
| R48 = ∞ | | | |

| Variable Separa- | Focal Length [mm] | | | | |
|---|---|---|---|---|---|
| tions | 5.72 | 10.30 | 22.88 | 34.32 | 45.77 |
| D18 | 0.98 | 15.46 | 28.86 | 33.65 | 36.35 |
| D25 | 38.11 | 21.58 | 7.05 | 3.45 | 2.74 |
| D28 | 3.76 | 5.81 | 6.94 | 5.75 | 3.76 |

| Variable Separa- | Object Distance [mm] | | | | |
|---|---|---|---|---|---|
| tions | ∞ | -3000 | -700 | -500 | *Min. |
| D8 | 4.13 | 5.14 | 8.17 | 9.61 | 12.64 |
| D10 | 7.15 | 6.44 | 4.32 | 3.31 | 1.19 |
| D13 | 3.74 | 3.44 | 2.53 | 2.10 | 1.19 |

*) Min. for Minimum Object Distance at -300.

(NUMERICAL EXAMPLE 3)

Zoom Ratio = 14.9  fw = 6.70  Fno = 1:1.64-2.10
Image Diagonal = 11.0  2ω = 78.76°-6.30°

| | | | |
|---|---|---|---|
| R1 = 428.42 | D1 = 3.50 | N1 = 1.69979 | v1 = 55.5 |
| R2 = 70.23 | D2 = 35.61 | | |
| R3 = -176.61 | D3 = 3.00 | N2 = 1.77621 | v2 = 49.6 |
| R4 = 288.24 | D4 = 0.15 | | |
| R5 = 160.33 | D5 = 12.23 | N3 = 1.81265 | v3 = 25.4 |
| R6 = -12815.11 | D6 = Variable | | |
| R7 = 1180.86 | D7 = 11.08 | N4 = 1.67279 | v4 = 57.3 |
| R8 = -208.70 | D8 = 0.20 | | |
| R9 = 3253.46 | D9 = 9.57 | N5 = 1.67279 | v5 = 57.3 |
| R10 = -205.01 | D10 = Variable | | |
| R11 = -404.06 | D11 = 2.50 | N6 = 1.77621 | v6 = 49.6 |
| R12 = 97.57 | D12 = 12.64 | N7 = 1.49845 | v7 = 81.6 |
| R13 = -955.04 | D13 = Variable | | |
| R14 = 192.78 | D14 = 2.50 | N8 = 1.93306 | v8 = 21.3 |
| R15 = 122.52 | D15 = 12.96 | N9 = 1.49845 | v9 = 81.6 |
| R16 = -188.01 | D16 = 0.20 | | |
| R17 = 154.01 | D17 = 11.71 | N10 = 1.43496 | v10 = 95.1 |
| R18 = -192.02 | D18 = 0.15 | | |
| R19 = 61.83 | D19 = 5.23 | N11 = 1.40845 | v11 = 81.6 |
| R20 = 86.99 | D20 = Variable | | |
| R21 = 64.71 | D21 = 1.65 | N12 = 1.77621 | v12 = 49.6 |
| R22 = 34.74 | D22 = 7.41 | | |
| R23 = -62.94 | D23 = 1.51 | N13 = 1.77621 | v13 = 49.6 |
| R24 = 61.81 | D24 = 7.77 | | |
| R25 = -43.75 | D25 = 1.51 | N14 = 1.77621 | v14 = 49.6 |
| R26 = 206.59 | D26 = 4.75 | N15 = 1.93306 | v15 = 21.3 |
| R27 = -72.54 | D27 = Variable | | |
| R28 = -535.12 | D28 = 6.13 | N16 = 1.48915 | v16 = 70.2 |
| R29 = -50.92 | D29 = 0.21 | | |
| R30 = 263.61 | D30 = 8.55 | N17 = 1.64254 | v17 = 60.1 |
| R31 = -47.42 | D31 = 1.65 | N18 = 1.81265 | v18 = 25.4 |
| R32 = -147.42 | D32 = 0.21 | | |
| R33 = 53.95 | D33 = 7.03 | N19 = 1.48915 | v19 = 70.2 |
| R34 = -646.25 | D34 = Variable | | |
| R35 = (Stop) | D35 = 4.10 | | |
| R36 = -34.54 | D36 = 0.96 | N20 = 1.65425 | v20 = 58.5 |
| R37 = 24.78 | D37 = 3.36 | N21 = 1.70443 | v21 = 30.1 |
| R38 = 49.32 | D38 = 6.58 | | |
| R39 = -29.97 | D39 = 1.03 | N22 = 1.64254 | v22 = 60.1 |
| R40 = -2416.74 | D40 = 6.00 | N23 = 1.69417 | v23 = 31.1 |
| R41 = -27.45 | D41 = 23.38 | | |
| R42 = 106.21 | D42 = 8.48 | N24 = 1.48915 | v24 = 70.2 |
| R43 = -30.74 | D43 = 1.51 | N25 = 1.76168 | v25 = 27.5 |
| R44 = -39.63 | D44 = 0.14 | | |
| R45 = 197.65 | D45 = 1.31 | N26 = 1.76168 | v26 = 27.5 |
| R46 = 27.77 | D46 = 6.72 | N27 = 1.51678 | v27 = 54.7 |
| R47 = -220.14 | D47 = 0.76 | | |
| R48 = 44.21 | D48 = 3.99 | N28 = 1.48915 | v28 = 70.2 |
| R49 = ∞ | D49 = 5.70 | | |
| R50 = ∞ | D50 = 47.57 | N29 = 1.51825 | v29 = 64.2 |
| R51 = ∞ | | | |

| Variable Separations | Focal Length [mm] | | | | |
|---|---|---|---|---|---|
| | 6.70 | 13.19 | 26.63 | 48.95 | 99.83 |
| D20 | 0.72 | 28.72 | 48.72 | 60.72 | 70.38 |
| D27 | 110.03 | 76.03 | 47.76 | 26.38 | 2.17 |
| D34 | 2.05 | 8.05 | 16.32 | 25.70 | 40.25 |

| Variable Separations | Object Distance [mm] | | | | |
|---|---|---|---|---|---|
| | ∞ | -5000 | -2500 | -1500 | *Min. |
| D6 | 2.88 | 4.87 | 6.79 | 9.23 | 12.10 |
| D10 | 7.23 | 6.10 | 5.01 | 3.63 | 2.01 |
| D13 | 6.02 | 5.15 | 4.32 | 3.26 | 2.01 |

*Min. for Minimum Object Distance at -1000.

TABLE 1

| | | Numerical Example | | |
|---|---|---|---|---|
| | Condition | 1 | 2 | 3 |
| (1) | N11n | 1.776 | 1.776 | 1.700 |
| | | 1.605 | 1.605 | 1.776 |
| | | 1.622 | 1.622 | |
| (2) | v11n | 49.6 | 49.6 | 55.5 |
| | | 60.7 | 60.7 | 49.6 |
| | | 60.3 | 60.3 | |
| (3) | $\Sigma\left(\frac{\phi 11k}{v11k}\right)/\phi 11$ | 0.0098 | 0.0097 | 0.0085 |
| (4) | $\phi 12aa/\phi 12$ | -0.708 | -0.642 | -0.873 |
| (5) | v12an | 27.5 | 27.5 | 49.6 |
| (6) | $\Sigma\left(\frac{\phi 12k}{v12k}\right)/\phi 12$ | -0.0078 | -0.0070 | -0.0013 |
| (7) | $\phi 13aa/\phi 13$ | -0.379 | -0.364 | -0.315 |
| (8) | v13an | 37.2 | 37.2 | 21.3 |
| (9) | $\Sigma\left(\frac{\phi 13k}{v13k}\right)/\phi 13$ | 0.0097 | 0.0090 | 0.0032 |
| (10) | M12p | — | 8.51 | 9.22 |
| | M12a | — | 2.55 | 4.00 |

According to the invention, as is understandable from the foregoing, for the 4-unit type of zoom lens, the first lens unit for focusing is constructed with three lens sub-units, i.e., a front lens sub-unit, an intermediate lens sub-unit and a rear lens sub-unit. Of these, the intermediate lens sub-unit is made axially movable for focusing. With the employment of such an inner focusing method, to increase the aperture ratio and the variable magnification ratio, the rules of design for each lens unit are set forth to reduce the variation of aberrations such as spherical aberration and chromatic aberrations with zooming and focusing. It is, therefore, possible to achieve a large relative aperture, high range zoom lens having an F-number of about 1.65 at the wide-angle end and a variable magnification ratio of 8 to 15 with a good stability of optical performance being maintained at a high level throughout the entire zooming range and throughout the entire focusing range.

What is claimed is:

1. A zoom lens comprising, in order from an object side to an image side, a first lens unit of positive refractive power which is stationary during zooming, a second lens unit of negative refractive power which is axially movable during zooming, a third lens unit which is axially movable during zooming, and a fourth lens unit of positive refractive power which is stationary during zooming, wherein said first lens unit comprises a front lens sub-unit including at least one positive lens and having a negative refractive power as a whole, an intermediate lens sub-unit including at least one positive lens and a cemented lens and having a positive refractive power as a whole, and a rear lens sub-unit including a cemented lens and having a positive refractive power as a whole, and wherein said intermediate lens sub-unit is moved toward the image side to effect focusing from an infinitely distant object to an object at a minimum object distance.

2. A zoom lens according to claim 1, wherein said front lens sub-unit has at least one negative lens, said cemented lens included in said intermediate lens sub-unit has a positive lens L12ap and a negative lens L12an, and said cemented lens included in said rear lens sub-unit has a negative lens L13an and a positive lens L13ap, and where a refractive index for the spectral e-line and an Abbe number of a material of said negative lens included in said front lens sub-unit are denoted by N11n and v11n, respectively, a refractive power and an Abbe number of a material of a k-th lens (k=1, 2, ...) included in said front lens sub-unit are denoted by $\phi 11k$ and v11k, respectively, a refractive power of said front lens sub-unit is denoted by $\phi 11$, a refractive power of a cemented surface of said cemented lens included in said intermediate lens sub-unit is denoted by $\phi 12aa$, an Abbe number of a material of said negative lens L12an is denoted by v12an, a refractive power and an Abbe number of a material of a k-th lens (k=1, 2, ...) included in said intermediate lens sub-unit are denoted by $\phi 12k$ and v12k, respectively, a refractive power of said intermediate lens sub-unit is denoted by $\phi 12$, a refractive power of a cemented surface of said cemented lens included in said rear lens sub-unit is denoted by $\phi 13aa$, an Abbe number of a material of said negative lens L13an is denoted by v13an, a refractive power and an Abbe number of a material of a k-th lens (k=1, 2, ...) included in said rear lens sub-unit are denoted by $\phi 13k$ and v13k, respectively, and a refractive power of said rear lens sub-unit is denoted by $\phi 13$, the following conditions are satisfied:

$$1.60 < N11n$$

$$49 < v11n$$

$$0.008 < \Sigma \left( \frac{\phi 11k}{v11k} \right) / \phi 11 < 0.01$$

$$-0.9 < \phi 12aa/\phi 12 < -0.6$$

$$25 < v12an < 51$$

$$-0.008 < \Sigma \left( \frac{\phi 12k}{v12k} \right) / \phi 12 < -0.001$$

$$-0.4 < \phi 13aa/\phi 13 < -0.3$$

$$20 < v13an < 40$$

$$0.003 < \Sigma \left( \frac{\phi 13k}{v13k} \right) / \phi 13 < 0.01.$$

3. A zoom lens according to claim 1, wherein said intermediate lens sub-unit comprises a lens L12p composed of one or two positive lens elements and a lens L12a composed of one cemented lens, and where amounts of movement of said lens L12p and said lens L12a during focusing from an infinitely distant object to an object at a minimum distance are denoted by M12p and M12a, respectively, the following condition is satisfied:

M12a<M12p.

4. A zoom lens according to claim 1, wherein said front lens sub-unit and said rear lens sub-unit are fixed.

* * * * *

UNITED STATES PATENT AND TRADEMARK OFFICE
CERTIFICATE OF CORRECTION

PATENT NO.   :   5,757,554

DATED        :   May 26, 1998

INVENTOR(S)  :   Kiyoshi FUKAMI

It is certified that error appears in the above-identified patent and that said Letters Patent is hereby corrected as shown below:

COLUMN 8:

Line 36, "distance" should read --distant--.

COLUMN 9:

Line 54, "284.3" should read --284.03--.

COLUMN 11:

Line 6, "4.88814" should read --1.88814--.

Signed and Sealed this

Fourth Day of May, 1999

Attest:

Q. TODD DICKINSON

Attesting Officer

Acting Commissioner of Patents and Trademarks